United States Patent [19]
Killmeyer

[11] 3,773,138
[45] Nov. 20, 1973

[54] ANTI-THEFT ARRANGEMENT FOR AUTOMOBILES

[76] Inventor: William S. Killmeyer, 2017 Clifton St., Youngstown, Ohio 44510

[22] Filed: June 22, 1971

[21] Appl. No.: 155,574

[52] U.S. Cl.............. 180/114, 70/241, 70/255, 200/19 L, 200/44, 307/10 AT, 340/63
[51] Int. Cl............................................ B60r 25/00
[58] Field of Search............. 180/114, 112; 340/63, 64; 307/10 AT; 200/19 L; 70/241, 255; 123/198 B

[56] References Cited
UNITED STATES PATENTS

| | | | |
|---|---|---|---|
| 1,889,343 | 11/1932 | Bahnyak | 180/114 |
| 1,549,325 | 8/1925 | Murray | 70/237 |
| 1,974,944 | 9/1934 | Black | 180/114 |
| 3,651,329 | 3/1972 | Marlowe | 180/114 X |
| 3,585,584 | 6/1971 | Behrend | 340/64 |
| 3,637,037 | 1/1972 | Doland et al. | 340/64 X |
| 1,348,090 | 7/1920 | Cooper | 180/114 |
| 2,861,644 | 11/1958 | Martin | 180/114 |
| 2,483,284 | 9/1949 | Jacobi | 180/114 |
| 3,010,531 | 11/1961 | Flora | 180/114 |

*Primary Examiner*—Kenneth H. Betts
*Assistant Examiner*—John P. Silverstrim
*Attorney*—Peter L. Klempay

[57] ABSTRACT

An automobile ignition system in which the coil, distributor, ignition switch, and related wiring are housed in a heavy walled enclosure securely mounted to the vehicle firewall. The enclosure has a locking cover and prevents the "hot wiring" of the ignition system.

3 Claims, 5 Drawing Figures

PATENTED NOV 20 1973

3,773,138

INVENTOR.
WILLIAM S. KILLMEYER
BY
Peter L. Klempay
AGENT

ANTI-THEFT ARRANGEMENT FOR AUTOMOBILES

Although removing the ignition key of an automobile locks the ignition switch in its off position, it is very easy for anyone with more than the minimum familiarity with automotive ignition systems to start and operate the vehicle by "hot wiring" the ignition switch, that is, by bridging appropriate terminals of the switch with a short length of wire, thereby effectively bypassing the ignition switch. Various arrangements have been proposed in the past to render it more difficult for a thief to operate an automobile. However, with the prior arrangements it is still possible to bypass the locking means of the systems and thus defeat the purposes of the anti-theft device.

It is the primary object of the present invention to provide an anti-theft arrangement for an automotive vehicle which makes the unauthorized operation of the vehicle practically impossible.

It is also an object of the present invention to provide an automotive anti-theft system in which access to key components of the system is restricted to prevent any tampering with these components.

Yet another object of the invention is the provision of a vehicle anti-theft system by which the possibility of "hot wiring" the system is eliminated.

A further object of the invention is a provision of a vehicle anti-theft system which is reliable in operation and which can be produced inexpensively.

As will become apparent from the following detailed description the above and other objects of the invention are achieved by providing a vehicle anti-theft system in which the ignition switch coil and distributor together with the wiring interconnecting these components are housed in a strong walled theft proof compartment which is securely anchored to the vehicle firewall and which is provided with a locking cover. The system may include relays to break the ignition circuit if unauthorized entry to the enclosure is attempted.

For a more complete understanding of the invention and the objects and advantages thereof reference should be had to the following detailed description and the accompanying drawing wherein there is shown a preferred embodiment of the invention.

Figure 1:
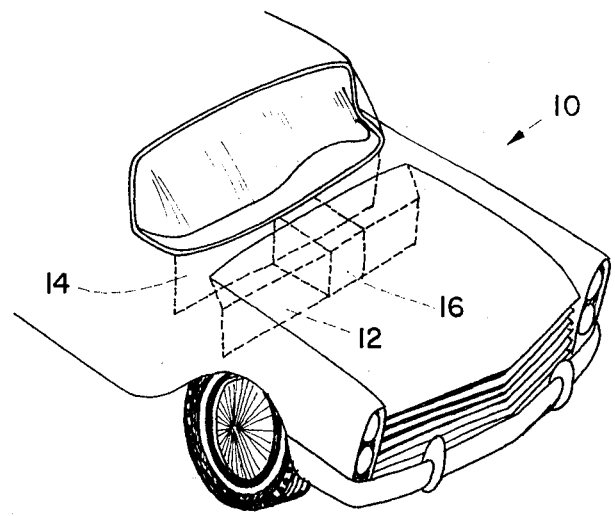
FIG. 1 is a perspective view of an automobile equipped with the anti-theft arrangement of the present invention.
Figure 2:
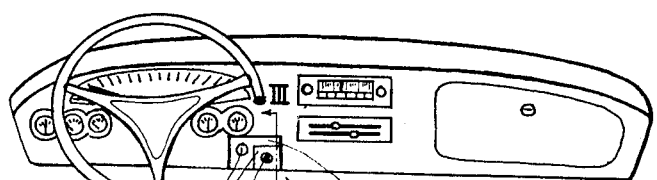
FIG. 2 is an elevational view of the instrument panel of the automobile of FIG. 1.

The reference numeral 10 in FIG. 1 designates an automobile which may be of conventional American construction having a front mounted, gasoline powered, internal combustion engine. At the rear of the engine compartment there is a firewall 12. Within the passenger compartment of the vehicle and spaced from the firewall is an instrument panel 14. In order to prevent the unauthorized operation of the vehicle 1 provide a box-like enclosure 16 which houses certain components of the automobile ignition system and which is securely anchored to the firewall 12.

Figure 3:
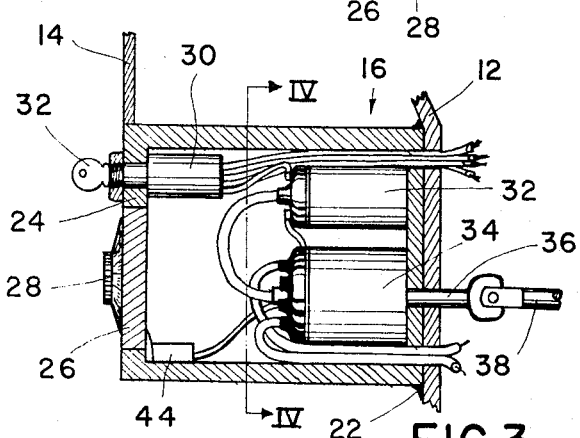
FIG. 3 is a fragmentary sectional view taken along the line III—III of FIG. 2.
Figure 4:
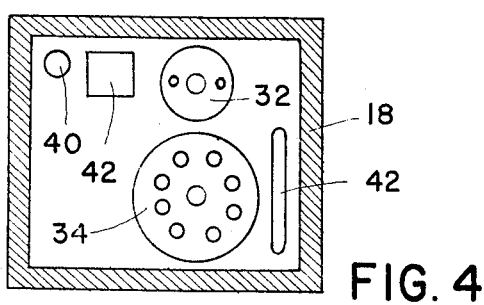
FIG. 4 is a sectional view taken along the line IV—IV of FIG. 3, with the wiring that connects the various components omitted for clarity.
Figure 5:
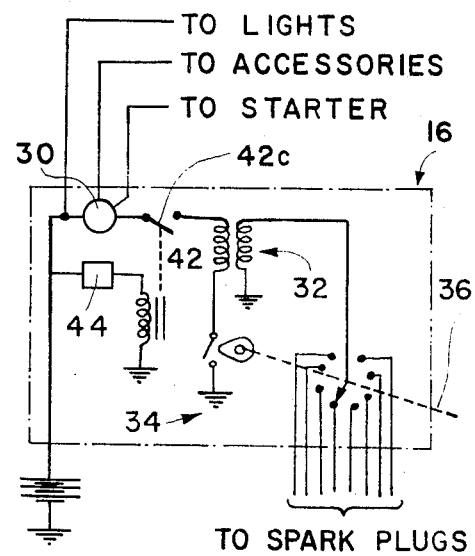
FIG. 5 is a schematic diagram of the ignition circuit of the automobile.

As can be seen most clearly from FIGS. 3 and 4, the enclosure 16 has heavy steel side walls 18, a rear wall 20 which is preferably also of heavy steel, a front wall 24, and a door 26 received in the front wall. The enclosure is secured in place for example by being welded to the firewall 12, as indicated at 22. Preferably, the front wall 24 of the enclosure 16 forms a part of the instrument panel 14 of the vehicle and is designed to blend with the remainder of the instrument panel to have a pleasing and inconspicuous appearance.

Housed within the enclosure 16 and supported by the front wall 24 is the ignition lock switch 30 which is operated by a key 32 inserted from the instrument panel side of the front wall 24. The high tension coil 32 and the distributor 34 of the engine ignition system are also housed within the enclosure 16. The distributor shaft 36 protrudes through the rear wall 20 of the enclosure and through the firewall 12 and is connected, by any suitable arrangement such as the universal joint 38, to a rotating shaft of the internal combustion engine, for example, to a cam shaft. All the wiring which interconnects the ignition lock switch 30, the coil 32, and the distributor 34 is within the enclosure 16. A first opening 40 through the rear wall 20 of the enclosure and through the firewall 12 is provided for the wires providing electrical connections between the ignition lock switch 30 and the vehicle battery, the vehicle lights and accessories, and the engine starter. The secondary leads from the distributor to the individual spark plugs of the engine pass through a second opening 42 extending through the rear wall 20 of the enclosure 16 and through the firewall 12.

The ignition lock switch 30, coil 32, and distributor 34 may all be conventional components. The distributor 34 may be provided with a conventional vacuum advance control mechanism (not shown). In this arrangement, an additional opening would be provided in the rear wall 20 and in the firewall 12 to admit the vacuum line for the vacuum advance mechanism.

The walls and door of the enclosure 16 are preferably of heavy steel plate so that the enclosure cannot be pried or easily cut open. The door provides access to the various components within the enclosure 16 when maintenance is necessary. The door 26 may be latched by any suitable means such as a lock controlled by the ignition key or, preferably, by a separate lock such as the combination lock 28.

The invention also contemplates that means may be provided to render the electrical system inoperative when the enclosure door 26 is opened. One possible arrangement includes a switch 44 which is mounted in a relatively concealed position and which is normally held in its open position by the door 26 when the door is closed. Opening of the door 26 causes the switch 44 to close energizing a relay 42 which has a contact 42c which normally completes a circuit from the ignition lock switch 30 to the primary winding of the coil 32. Energization of the relay 42 causes contact 42c to open breaking the circuit to the coil 32. Preferably the switch 44 is one which may be manually reset when the door 26 is open so that a person familiar with the system can open the switch 44 when this is desired, for example, while tuning up the engine.

It should now be apparent that I have provided an improved anti-theft arrangement for a motor vehicle. By housing the key components of the ignition system and the related wiring within a strong-walled enclosure, the unauthorized tampering with such components and the "hot wiring" of the vehicle is prevented. Since the system does not require complicated interlocks, the possibility of malfunctioning of the system is also avoided.

It will be understood that while only the best known embodiment of the invention has been illustrated and described in detail herein, the invention is not so limited but may be subject to changes and/or additions. Reference should thus be had to the appended claims in determining the true scope of the invention.

I claim:

1. In a vehicle having an engine compartment, a passenger compartment, a firewall separating the engine and passenger compartments, an internal combustion engine in the engine compartment, and an ignition system for the engine including a key operated ignition switch, a coil, and a distributor, an improved anti-theft arrangement comprising:

a steel walled enclosure secured to the firewall on the passenger compartment side thereof, the enclosure having an opening permitting access to the interior of the enclosure, the ignition switch being mounted through a wall of the enclosure with the key insertable from the outside the enclosure and all electrical connections to the switch being within the enclosure, the coil and the distributor and the electrical connections between the switch, the coil and the distributor being entirely within the enclosure;

a steel cover for the enclosure opening; and locking means for securing the cover to the enclosure.

2. In a vehicle having an engine compartment, a passenger compartment, a firewall separating the engine and passenger compartments, an internal combustion engine in the engine compartment, and an ignition system for the engine including a key operated ignition switch, a coil, and a distributor, an improved anti-theft arrangement comprising:

a steel walled enclosure secured to the firewall on the passenger compartment side thereof, the enclosure having an opening permitting access to the interior of the enclosure, the ignition switch being mounted through a wall of the enclosure with the key insertable from outside the enclosure and all electrical connections to the switch being within the enclosure, the coil and the electrical connections between the switch and the coil being entirely within the enclosure;

a steel cover for the enclosure opening;

locking means securing the cover to the enclosure;

means detecting the opening of the cover; and a relay controlled by the detecting means and operative to disconnect the switch from the coil upon opening of the cover.

3. The anti-theft arrangement according to claim 7 further including means to manually override the means for detecting.

* * * * *

UNITED STATES PATENT OFFICE
CERTIFICATE OF CORRECTION

Patent No. 3,773,138　　　　　　　　Dated November 20, 1973

Inventor(s) William S. Killmeyer

It is certified that error appears in the above-identified patent and that said Letters Patent are hereby corrected as shown below:

Cover page, between items [76] and [22], insert:

--[73] Assignees: Elsie Marie Mears; Thomas G. Welsh, Michael J. Kardas, Jr., Youngstown, Ohio; part interest to each--.

Column 1, line 67, "1" should read --I--.

Column 4, line 27, "7" should read --2--.

Signed and sealed this 2nd day of April 1974.

(SEAL)
Attest:

EDWARD M. FLETCHER, JR.
Attesting Officer

C. MARSHALL DANN
Commissioner of Patents